(12) United States Patent
Imamura et al.

(10) Patent No.: US 7,459,096 B2
(45) Date of Patent: Dec. 2, 2008

(54) METHOD OF MAKING MAGNETIC RECORDING MEDIUM AND DIE THEREFOR

(75) Inventors: Takahiro Imamura, Kawasaki (JP); Yutaka Nakamura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 346 days.

(21) Appl. No.: 11/141,624

(22) Filed: May 31, 2005

(65) Prior Publication Data

US 2006/0175285 A1 Aug. 10, 2006

(30) Foreign Application Priority Data

Feb. 7, 2005 (JP) .............................. 2005-030433

(51) Int. Cl.
*B44C 1/22* (2006.01)
(52) U.S. Cl. ....................................... 216/22
(58) Field of Classification Search .................. None
See application file for complete search history.

(56) References Cited

U.S. PATENT DOCUMENTS

| | | | |
|---|---|---|---|
| 5,448,419 A * | 9/1995 | Bigelow et al. ................ 360/17 |
| 6,042,927 A * | 3/2000 | Uchiyama et al. ............ 428/141 |
| 6,086,961 A | 7/2000 | Bonyhard |
| 6,177,175 B1 * | 1/2001 | Hashimoto ................... 428/141 |
| 6,706,358 B1 * | 3/2004 | McDaniel et al. ........... 428/64.1 |
| 6,757,126 B1 * | 6/2004 | Kuroda et al. ............. 360/77.02 |
| 6,761,618 B1 | 7/2004 | Leigh et al. |
| 7,029,798 B1 * | 4/2006 | Formato ......................... 430/3 |
| 2002/0055018 A1 * | 5/2002 | Takeshita et al. ........ 428/694 SG |
| 2002/0182443 A1 * | 12/2002 | Ohkubo ................. 428/694 SG |
| 2004/0033389 A1 * | 2/2004 | Ozawa et al. ........... 428/694 BR |
| 2004/0057149 A1 * | 3/2004 | Yoshizawa et al. ............. 360/69 |
| 2004/0080871 A1 * | 4/2004 | Usa et al. ....................... 360/135 |
| 2004/0182820 A1 * | 9/2004 | Motowaki et al. .............. 216/44 |
| 2004/0191700 A1 * | 9/2004 | Kuwabara et al. ............ 430/320 |
| 2004/0200368 A1 * | 10/2004 | Ogino et al. .................... 101/34 |
| 2004/0233560 A1 * | 11/2004 | Nishikawa ..................... 360/17 |
| 2005/0013047 A1 * | 1/2005 | Takai et al. .................. 360/135 |
| 2005/0069732 A1 * | 3/2005 | Kamata et al. ......... 428/694 TC |
| 2005/0146992 A1 * | 7/2005 | Inomata et al. ........... 369/13.02 |
| 2005/0191526 A1 * | 9/2005 | Fujita et al. ................ 428/848.5 |
| 2005/0196650 A1 * | 9/2005 | Suwa et al. .................. 428/848 |

(Continued)

FOREIGN PATENT DOCUMENTS

WO    WO 2005/008636    1/2005

*Primary Examiner*—Allan Olsen
(74) *Attorney, Agent, or Firm*—Greer, Burns & Crain, Ltd.

(57) ABSTRACT

A resist film is formed on the surface of a magnetic layer on a substrate. A die is overlaid on the surface of the magnetic layer. The die includes magnetic and non-magnetic regions alternately arranged on a flat surface around a groove. The resist film is embossed so that the flat surface drives the resist film into the groove of the die. The resist film within the groove gets solidified while the die is kept in contact with the magnetic layer. A magnetic field is applied to the die in contact with the magnetic layer. A magnetic field leaked out of the magnetic regions acts on the magnetic layer. Magnetic information is thus written into the magnetic layer based on the leaked magnetic field. A recording track can be established in the magnetic layer based on the solidified resist film.

2 Claims, 6 Drawing Sheets

U.S. PATENT DOCUMENTS

| | | |
|---|---|---|
| 2005/0200991 A1* | 9/2005 | Komatsu et al. ............... 360/17 |
| 2005/0213239 A1* | 9/2005 | Hibi et al. .................... 360/48 |
| 2005/0225890 A1* | 10/2005 | Sakurai et al. ................ 360/48 |
| 2006/0065143 A1* | 3/2006 | Sakurai et al. ............... 101/368 |
| 2006/0121318 A1* | 6/2006 | Gage et al. .................. 428/827 |

* cited by examiner

METHOD OF MAKING MAGNETIC RECORDING MEDIUM AND DIE THEREFOR

BACKGROUND OF THE INVENTION

1. Field of the Invention

The present invention relates to a method of making a magnetic recording medium such as a discrete track recording medium.

2. Description of the Prior Art

A hard disk of a discrete track recording medium is well known. The hard disk of the type includes separation tracks for isolating the adjacent recording tracks. Data sections and servo sections are alternately defined in the recording tracks. Magnetic information read out of the servo sections is utilized to position a head relative to the hard disk.

A method of making the hard disk includes forming the recording tracks and separation tracks over a substrate. Magnetic information is thereafter written into the servo sections. However, it is difficult to position the magnetic information right on the recording tracks. It takes a longer time to accurately position the magnetic information. This causes an increase in the production cost.

SUMMARY OF THE INVENTION

It is accordingly an object of the present invention to provide a method of making a magnetic recording medium contributing a reduced cost and a shortened operating time. It is an object of the present invention to provide a die greatly contributing to realization of such a method.

According to the present invention, there is provided a method of making a magnetic recording medium, comprising: forming a resist film on the surface of a magnetic layer on the surface of a substrate; contacting a die, including magnetic and non-magnetic regions alternately arranged on a flat surface around a groove, against the surface of the magnetic layer so as to embossing the resist film; solidifying the resist film while keeping the die in contact with the magnetic layer; and applying a magnetic field to the magnetic regions while keeping the die in contact with the magnetic layer.

When the die is overlaid on the surface of the magnetic layer, the resist film is embossed so that the flat surface drives the resist film into the groove of the die. The resist film within the groove then gets solidified while the die is kept in contact with the magnetic layer. A magnetic field is applied to the die in contact with the magnetic layer. A magnetic flux is leaked out of the magnetic regions. The leaked magnetic field acts on the magnetic layer. Magnetic information is thus written into the magnetic layer based on the leaked magnetic field. Magnetic information such as a servo pattern is in this manner established in the magnetic layer. At the same time, the resist film inside the groove serves to determine the position of recording and separation tracks on the substrate, for example. The magnetic information can be positioned relative to the recording tracks with a higher accuracy in a facilitated manner. This method contributes to a reduced production cost and a shortened operating time.

The method may further comprise: forming a mask on the surface of the magnetic layer and the surface of the resist film after removal of the die from the substrate; removing the resist film; and removing the magnetic layer around the mask. The method allows establishment of the magnetization in the magnetic layer in the aforementioned manner. The mask is then formed on the surfaces of the magnetic layer and the resist film. After the resist film is removed along with the mask located thereon, the magnetic layer is removed around the mask. When the mask is removed, the magnetic layer having the magnetization remains on the substrate. The remaining magnetic layer serves as a recording track on the substrate. A non-magnetic layer may be formed between the adjacent recording tracks. The non-magnetic layer is thus allowed to serve as a separation track, for example.

A specific die may be provided to realize the aforementioned method of making the magnetic recording disk. The die may include: a body; a flat surface defined on the body, the flat surface to be superposed on the surface of the magnetic recording medium; a groove defined in the flat surface; and magnetic and non-magnetic regions alternately arranged on the flat surface around the groove.

BRIEF DESCRIPTION OF THE DRAWINGS

The above and other objects, features and advantages of the present invention will become apparent from the following description of the preferred embodiments in conjunction with the accompanying drawings, wherein.

DESCRIPTION OF THE PREFERRED EMBODIMENTS

Figure 1:
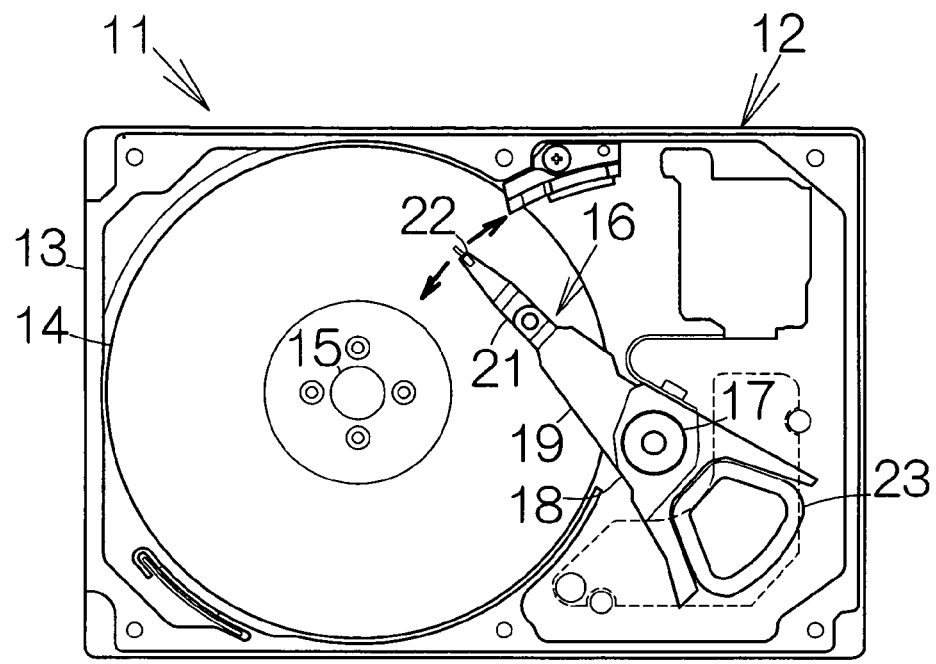
FIG. 1 is a plan view schematically illustrating the structure of a hard disk drive (HDD) as an example of a recording disk drive.

FIG. 1 schematically illustrates the inner structure of a hard disk drive (HDD) 11 as an example of a recording disk drive or storage device according to an embodiment of the present invention. The HDD 11 has a box-shaped enclosure 12. The enclosure 12 includes a main enclosure 13 defining an inner space of a flat parallelepiped, for example. The main enclosure 13 may be made of a metallic material such as aluminum, for example. Molding process may be employed to form the main enclosure 13. A cover, not shown, is coupled to the main enclosure 13 so as to define the closed inner space between the main enclosure 13 and the cover itself. Pressing process may be employed to form the cover out of a single plate such as an aluminum plate, for example.

A printed circuit board, not shown, is attached to the outside of the main enclosure 13. LSI chips such as a microprocessor unit (MPU), a hard disk controller (HDC), and the like, not shown, are mounted on the printed circuit board. The MPU and the hard disk controller serve to control the operation of the hard disk drive 11. Electric power is supplied to the MPU and the hard disk controller for operations through cables, for example.

At least one magnetic recording disk 14 as an example of a recording medium is incorporated in the inner space of the enclosure 12. The magnetic recording disk or disks 14 is mounted on the driving shaft of a spindle motor 15. The spindle motor 15 is allowed to drive the magnetic recording disk or disks 14 for rotation at a higher revolution speed such as 5,400 rpm, 7,200 rpm, 10,000 rpm, or the like, for example.

A head actuator 16 is also incorporated in the inner space of the enclosure 12. The head actuator 16 comprises an actuator block 18. The actuator block 18 is coupled to a vertical support shaft 17 for relative rotation. Rigid actuator arms 19 are defined in the actuator block 18 so as to extend in the horizontal direction from the vertical support shaft 17. The actuator arms 19 are related to the front and back surfaces of the magnetic recording disk 14. The actuator block 18 may be made of aluminum. Molding process may be employed to form the actuator block 18.

Head suspensions 21 are fixed to the corresponding tip ends of the actuator arms 19 so as to further extend in the forward direction from the actuator arms 19. As conventionally known, a flying head slider 22 is supported at the front end of the individual head suspension 21. The flying head slider 22 is in this manner connected to the actuator block 18. The flying head slider 22 is opposed to the surface of the magnetic recording disk 14.

An electromagnetic transducer, not shown, is mounted on the flying head slider 22. The electromagnetic transducer may include a read element and a write element. The read element may include a giant magnetoresistive (GMR) element or a tunnel-junction magnetoresistive (TMR) element designed to discriminate magnetic bit data on the magnetic recording disk 14 by utilizing variation in the electric resistance of a spin valve film or a tunnel-junction film, for example. The write element may include a thin film magnetic head designed to write magnetic bit data into the magnetic recording disk 14 by utilizing a magnetic field induced at a thin film coil pattern.

The head suspension 21 serves to urge the flying head slider 22 toward the surface of the magnetic recording disk 14. When the magnetic recording disk 14 rotates, the flying head slider 22 is allowed to receive airflow generated along the rotating magnetic recording disk 14. The airflow serves to generate a positive pressure or lift on the flying head slider 22. The flying head slider 22 is thus allowed to keep flying above the surface of the magnetic recording disk 14 during the rotation of the magnetic recording disk 14 at a higher stability established by the balance between the urging force of the head suspension 21 and the lift.

A power source such as a voice coil motor 23 is coupled to the actuator block 18. The voice coil motor 23 serves to drive the actuator block 18 for rotation around the support shaft 17. The rotation of the actuator block 18 induces the swinging movement of the actuator arms 19 and the head suspensions 21. When the actuator arm 19 is driven to swing about the support shaft 17 during the flight of the flying head slider 22, the flying head slider 22 is allowed to move along the radial direction of the magnetic recording disk 14. As conventionally known, in the case where two or more magnetic recording disks 14 are incorporated within the main enclosure 13, a pair of the actuator arms 19, namely a pair of the head suspensions 21 is disposed between the adjacent magnetic recording disks 14.

Figure 2:
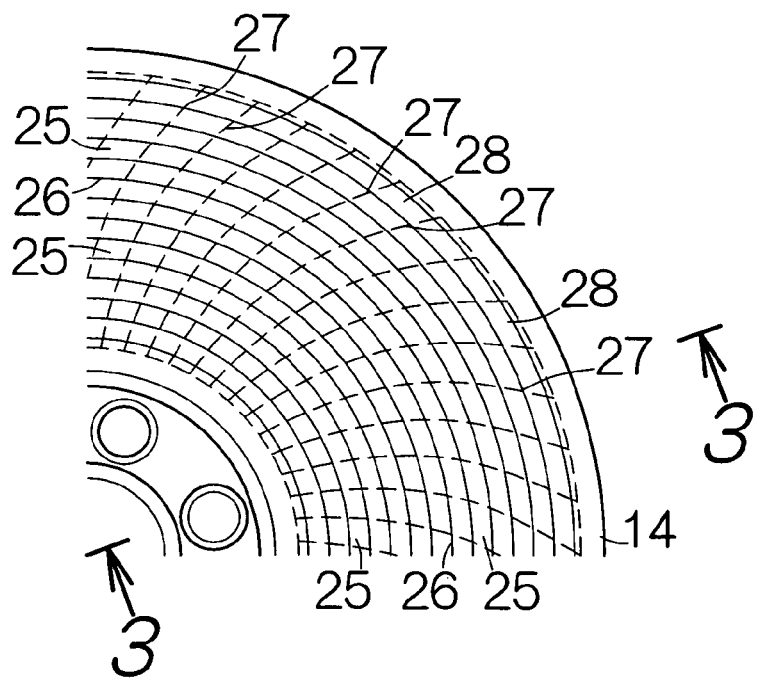
FIG. 2 is an enlarged partial plan view of a magnetic recording disk employed in the hard disk drive according to a first embodiment of the present invention.

As shown in FIG. 2, stripes of recording tracks 25, 25, . . . , are defined on the front and back surfaces of the magnetic recording disk 14 according to a first embodiment of the present invention. The recording track extends in the circumferential direction of the magnetic recording disk 14. The recording tracks 25 are made of a magnetic material. Magnetic information is held in the recording tracks 25. A non-recording or separation track 26 is interposed between the individual adjacent ones of the recording tracks 25, 25 so as to isolate the adjacent recording tracks 25, 25 from each other. The separation tracks 26 extend in the circumferential direction of the magnetic recording disk 14. The separation tracks 26 are made of a non-magnetic material.

Bent servo sectors 27 of sixty stripes, for example, are defined on the front and back surfaces of the magnetic recording disk 14 so as to extend in the radial direction of the magnetic recording disk 14. The servo sectors 27 serve to fragment the recording tracks 25 and the separation tracks 26. The servo sectors 27 are made of a magnetic material. Servo patterns are established in the servo sectors 27 as described later in detail. Data sectors 28 are established between the adjacent servo sectors 27. Magnetic information is held in the recording tracks 25 within the data sectors 28.

Figure 3:
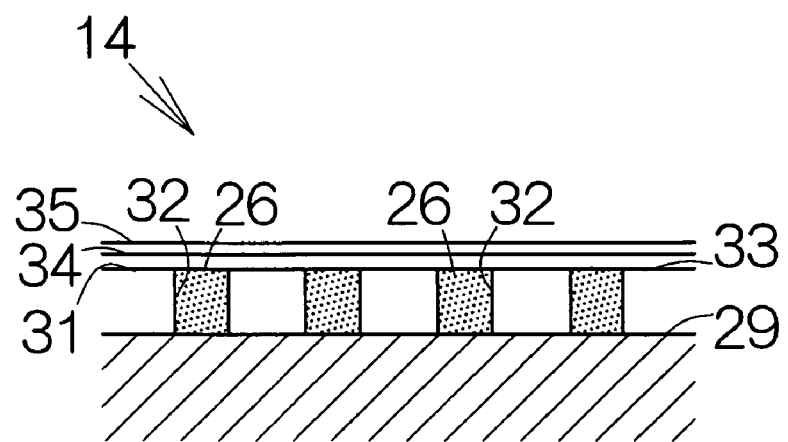
FIG. 3 is an enlarged partial sectional view taken along the line 3-3 in FIG. 2.

As shown in FIG. 3, the magnetic recording disk 14 includes a substrate 29. A glass substrate may be utilized as the substrate 29, for example. A magnetic layer 31 is overlaid on the surface of the substrate 29. The recording tracks 25 and the servo sectors 27 are established within the magnetic layer 31. Grooves 32 are formed in the magnetic layer 31. The grooves 32 are filled with a non-magnetic material. The non-magnetic material in the grooves 32 corresponds to the separation tracks 26. A flat surface 33 is defined over the surfaces of the recording tracks 25 and separation tracks 26. The flat surface 33 may be covered with a protection layer 34, such as a diamond-like-carbon (DLC) film, a lubricating film 35, such as a perfluoropolyether (PFPE) film, and the like, for example. The magnetic recording disk 14 of the type is suitable for in-plane magnetic recording. The axis of easy magnetization is set in the magnetic layer 31 in the direction in parallel with the surface of the magnetic layer 31.

Figure 4:
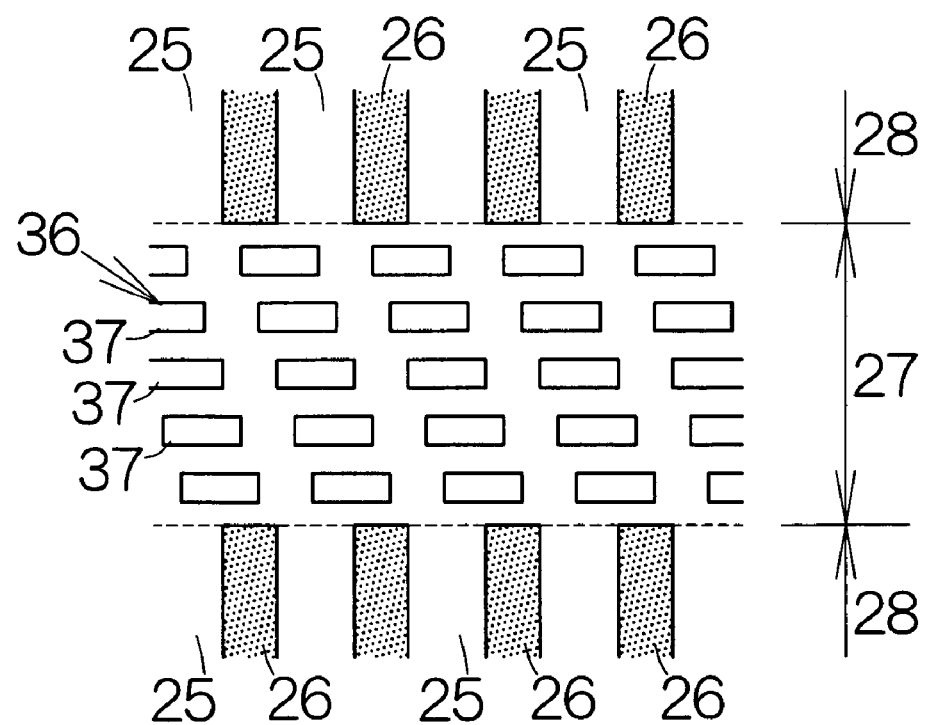
FIG. 4 is an enlarged partial plan view schematically illustrating the structure of a servo sector on the magnetic recording disk.

Referring also to FIG. 4, a servo pattern 36 is established in the servo sector 27. The servo pattern 36 includes inverted magnetized regions 37. The magnetization is established in the inverted magnetized regions 37 along the longitudinal direction of the recording tracks 25. The magnetization in the inverted magnetized regions 37 is opposed to the magnetization in the remaining region over the servo sector 27 at the upstream or downstream boundaries of the inverted magnetized regions 37. A magnetic field is leaked out of the servo sector 27 at the boundaries of the inverted magnetized regions 37. The inverted magnetized region 37 shifts in the radial direction of the magnetic recording disk 14 from the adjacent inverted magnetized region 37 on the identical recording track 25. The electromagnetic transducer on the flying head slider 22 serves to read the magnetic information recorded in the servo pattern 36. The read magnetic information is utilized to position the flying head slider 22 in the radial direction of the magnetic recording disk 14. The shape of the servo sectors 27 depends on the movement path of the electromagnetic transducer.

When the flying head slider 22 is positioned in the radial direction of the magnetic recording disk 14 during the rotation of the magnetic recording disk 14, the electromagnetic transducer on the flying head slider 22 is allowed to follow a target recording track 25. The write element of the electromagnetic transducer writes information into the target recording track 25 within the data sectors 28. The read element of the electromagnetic transducer reads out bit data sequences from the target recording track 25 within the data sectors 28. The write and read operations of information are in this manner realized within the data sectors 28.

The electromagnetic transducer on the flying head slider 22 keeps following the recording track 25 based on the servo control during the write and read operations. Position signals are read out from the servo patterns 36 during the servo control. The position signals are supplied to the hard disk controller after amplification. The hard disk controller determines the control quantity for the voice coil motor 23 based on the supplied position signals. A driving current is supplied to the voice coil motor 23 based on the control signals supplied from the hard disk controller. The position signals are in this manner utilized to counteract a deviation of the electromagnetic transducer from the target recording track 25 in the radial direction of the magnetic recording disk 14.

Figure 5:
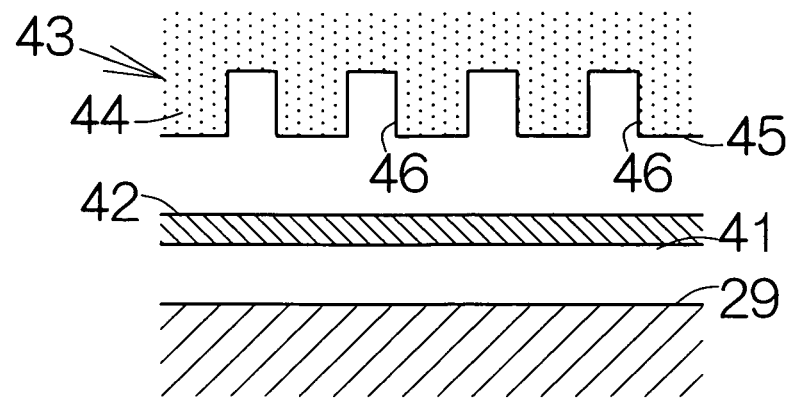
FIG. 5 is an enlarged partial sectional view of a substrate for schematically illustrating the process of forming a magnetic layer and a resist film on the surface of the substrate.

Next, description will be made on a method of making the magnetic recording disk 14. A disk-shaped substrate 29 is first prepared. As shown in FIG. 5, a magnetic layer 41 is formed on the surfaces of the substrate 29. Sputtering process may be employed in this case, for example. The magnetic layer 41 may be made of an alloy including a magnetic element such as Fe, Ni and Co, for example. A photoresist is applied to the surface of the magnetic layer 41 on the surface of the substrate 29. A resist film 42 is thus formed.

A die 43 is then prepared. The die 43 includes a disk-shaped body 44, for example. The body 44 is made of a magnetic material. A flat surface 45 is defined on the body 44. The flat surface 45 is opposed to the surface of the substrate 29. Grooves 46, 46, . . . are defined in the flat surface 45. The grooves 46, 46, . . . are allowed to extend in the circumferential direction of the body 44. The contours of the grooves 46 correspond to the contours of the separation tracks 26. The flat surface 45 is thus contoured to reflect the contours of the recording tracks 25 and the servo sectors 27.

Figure 6:
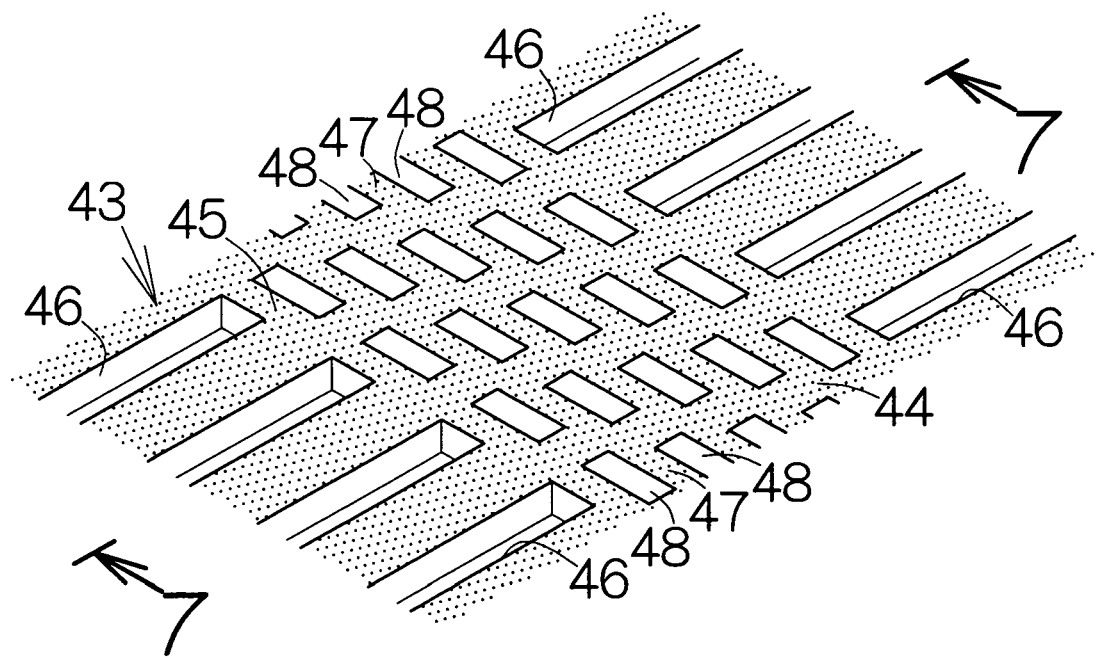
FIG. 6 is an enlarged perspective view schematically illustrating the structure of a die.
Figure 7:
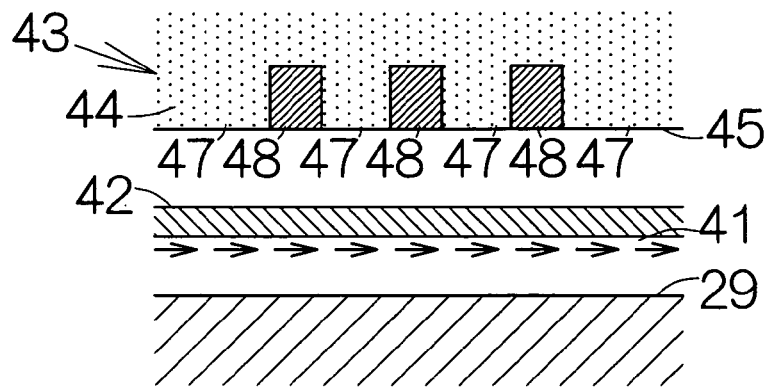
FIG. 7 is an enlarged partial sectional view schematically illustrating magnetic and non-magnetic regions alternately arranged in the die.

As shown in FIG. 6, magnetic regions 47 and non-magnetic regions 48 are alternately arranged in the flat surface 45 around the grooves 46. The arrangement of the non-magnetic regions 48 reflects the arrangement of the servo pattern 36. The pattern of the non-magnetic regions 48 reflects the arrangement of the inverted magnetized regions 37. Referring also to FIG. 7, the magnetic regions 47 and the non-magnetic regions 48 are located adjacent each other in the circumferential direction of the body 44. Magnetization is established in the magnetic layer 41 in a predetermined direction. The magnetization is set in the circumferential direction of the magnetic recording disk 14, for example.

Figure 8:
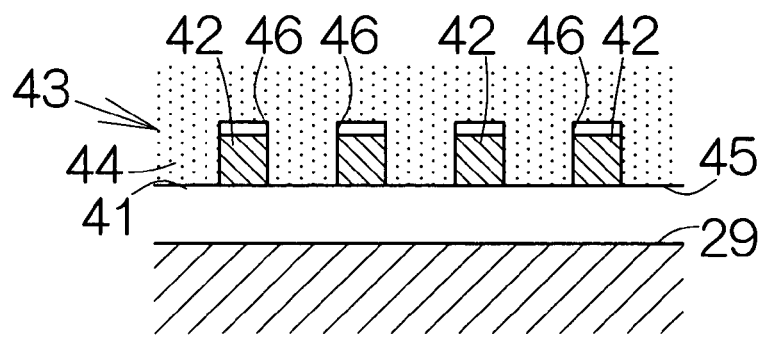
FIG. 8 is an enlarged partial sectional view schematically illustrating the process of overlaying the surface of the magnetic layer with the die.

The die 43 is superposed on the surface of the substrate 29. The die 43 is pressed against the surface of the substrate 29 by a predetermined pressure. The flat surface 45 is contacted on the surface of the magnetic layer 41. The resist film 42 is in this manner embossed. As shown in FIG. 8, the flat surface 45 drives the resist film 42 into the grooves 46 of the die 43. The substrate 29 and the die 43 are then subjected to heat treatment. The substrate 29 and the die 43 are thereafter cooled down to the room temperature. The resist film gets solidified in response to the applied heat. In this case, the die 43 is kept in contact with the magnetic layer 41 during the solidification of the resist film 42.

Figure 9:
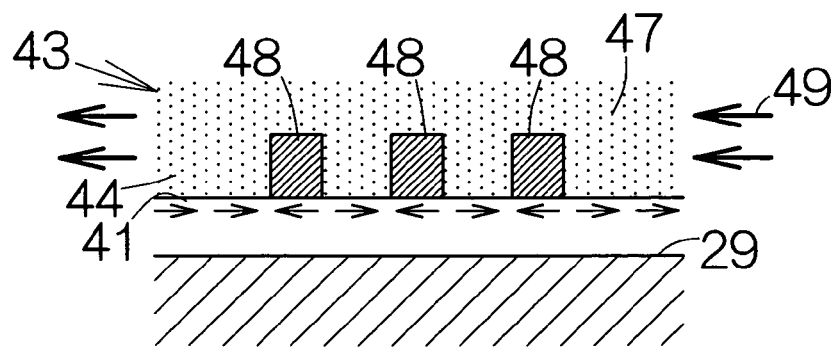
FIG. 9 is an enlarged partial sectional view schematically illustrating the process of applying a magnetic field to the die.

As shown in FIG. 9, a magnetic field 49 is applied to the die 43. In this case, the die 43 is kept in contact with the magnetic layer 41 during the application of the magnetic field. A predetermined magnetizing mechanism, not shown, may be utilized to form the magnetic field. A magnetic flux circulates in the magnetic field 49 in the circumferential direction of the substrate 29. The magnetic flux passes through the magnetic regions 47. The magnetic flux runs around the substrate 29 between the adjacent magnetic regions 47. This magnetic flux forms a magnetic field based on the leakage out of the die 43. This magnetic field acts on the magnetic layer 41. Magnetization is established in the magnetic layer 41 based on the leakage of the magnetic flux in the direction opposite to the magnetization previously set in the substrate 29. The inversed magnetized regions 37 are in this manner established in the magnetic layer 41.

Figure 10:
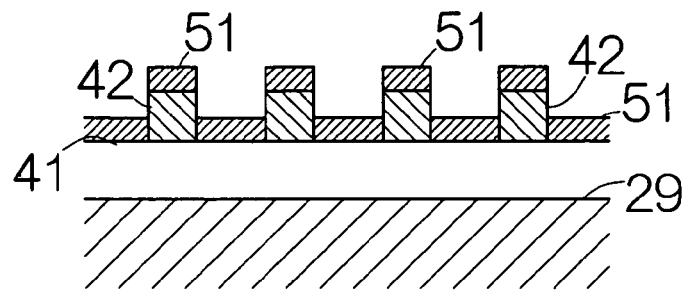
FIG. 10 is an enlarged partial sectional view schematically illustrating the process of forming a mask on the surface of the magnetic layer.
Figure 11:
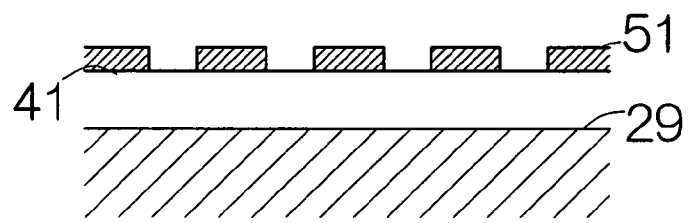
FIG. 11 is an enlarged partial sectional view schematically illustrating the process of removing the resist film.

The die 43 is thereafter removed from the substrate 29. As shown in FIG. 10, a mask 51 is formed on the surface of the magnetic layer 41. The mask 51 may be made of a metallic material, for example. Sputtering process may be employed to form the mask 51, for example. The magnetic layer 41 and the resist film 42 are thus covered with the mask 51. As shown in FIG. 11, the resist film 42 is then removed along with the mask 51 located thereon.

Figure 12:
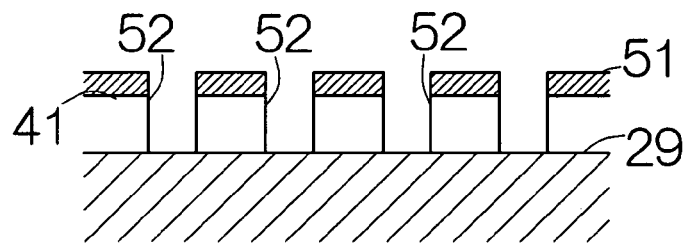
FIG. 12 is an enlarged partial sectional view schematically illustrating the process of etching the magnetic layer based on the mask.
Figure 13:
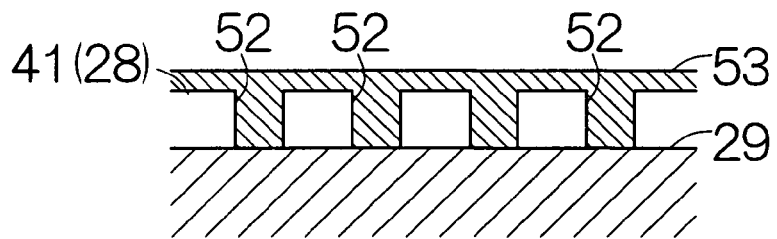
FIG. 13 is an enlarged partial sectional view schematically illustrating the process of forming a non-magnetic layer on the surface of the substrate.

Dry etching process is then effected on the substrate 29 around the mask 51 so as to remove the magnetic layer 41, for example. As shown in FIG. 12, grooves 52 are thus formed in the magnetic layer 41. The substrate 29 gets exposed at the bottoms of the grooves 52. Wet etching process is subsequently effected on the substrate 29 so as to remove the mask 51 on the magnetic layer 41, for example. As shown in FIG. 13, a non-magnetic layer 53, such as an oxide layer, is formed on the surface of the magnetic layer 41 on the substrate 29. The magnetic layer 41 is covered with the non-magnetic layer 53. Sputtering process may be employed to form the non-magnetic layer 53, for example.

Grinding process is thereafter effected on the surface of the non-magnetic layer 53. The surface of the magnetic layer 41 thus gets exposed inside the non-magnetic layer 53. The surfaces of the magnetic layer 41 and the non-magnetic layer 53 are flattened. The flat surface 33 is in this manner established. The recording tracks 25 and the separation tracks 26 are thus formed. The protection layer 34 and the lubricating layer 35 may thereafter be formed on the flat surface 33. The formation of the magnetic recording disk 14 has been completed.

The aforementioned method allows the die 43 to drive the resist film 42 into the grooves 46 of the die 43 when the die 43 is superposed on the surface of the substrate 29. The resist film 42 is embossed. The driven resist film 42 gets solidified in the grooves 46 while the die 43 is kept in contact with the substrate 29. The die 43 is subjected to a magnetic field. The magnetic flux runs between the adjacent magnetic regions 47. The leaked magnetic field acts on the magnetic layer 41. Magnetic information is thus written into the magnetic layer 41 based on the leaked magnetic field. The servo pattern 36 is thus established in the magnetic layer 41. At the same time, the resist films 42 inside the grooves 46 serve to determine the position of the recording tracks 25 and the separation tracks 26. The servo pattern 36 can in this manner be positioned relative to the recording tracks 25 with a higher accuracy in a facilitated manner. This method of making the magnetic recording disk 14 contributes to a reduced production cost and a shortened operating time.

Figure 14:
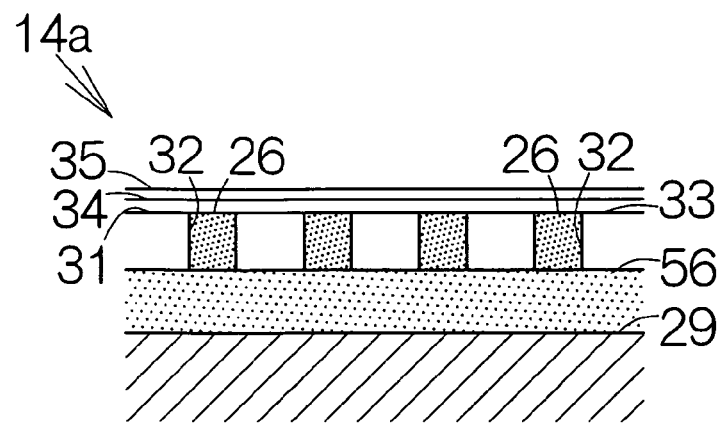
FIG. 14 is an enlarged partial sectional view, corresponding to FIG. 3, for illustrating the structure of a magnetic recording disk according to a second embodiment of the present invention.

FIG. 14 schematically illustrates the structure of a magnetic recording disk 14a according to a second embodiment of the present invention. The magnetic recording disk 14a is suitable for perpendicular magnetic recording. The axis of easy magnetization is set in the magnetic layer 31 in the direction perpendicular to the surface of the substrate 29. A soft magnetic underlayer 56 is interposed between the substrate 29 and the recording and separations tracks 25, 26 in the magnetic recording disk 14a. A single-pole head is employed as the write element to write magnetic information into the magnetic recording disk 14a. Primary and auxiliary magnetic poles of the single-pole head are opposed to the surface of the magnetic recording disk 14a. A magnetic flux is designed to circulate through the primary and auxiliary magnetic poles and the soft magnetic underlayer 56. Magnetization can in this manner be established in the recording tracks 25 in the direction perpendicular to the surface of the magnetic recording disk 14a. Like reference numerals are attached to structure or components equivalent to those of the aforementioned first embodiment.

Figure 15:
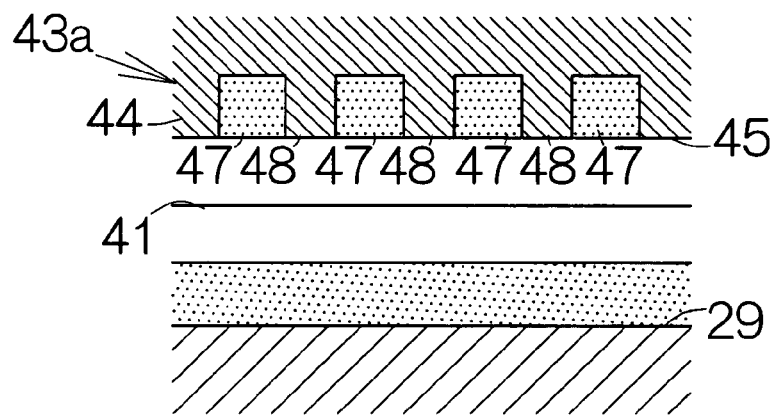
FIG. 15 is an enlarged partial sectional view schematically illustrating the structure of a die.

Next, a brief description will be made on a method of making the magnetic recording disk 14a. The soft magnetic underlayer 56 is formed on the surface of the substrate 29. Sputtering process may be employed to form the soft magnetic underlayer 56, for example. The magnetic layer 41 and the resist film 42 are sequentially formed on the surface of the soft magnetic underlayer 56 in the same manner as described above. A die 43a is subsequently prepared as shown in FIG. 15. The body 44 of the die 43a is made of a non-magnetic material. The magnetic regions 47 and the non-magnetic regions 48 are alternately arranged within the flat surface 45 around the grooves 46 on the die 43a. The magnetic regions 47 and the non-magnetic regions 48 are located adjacent each other in the circumferential direction of the body 44. The pattern of the magnetic regions 47 reflects the arrangement of the inverted magnetized regions 37.

Figure 16:
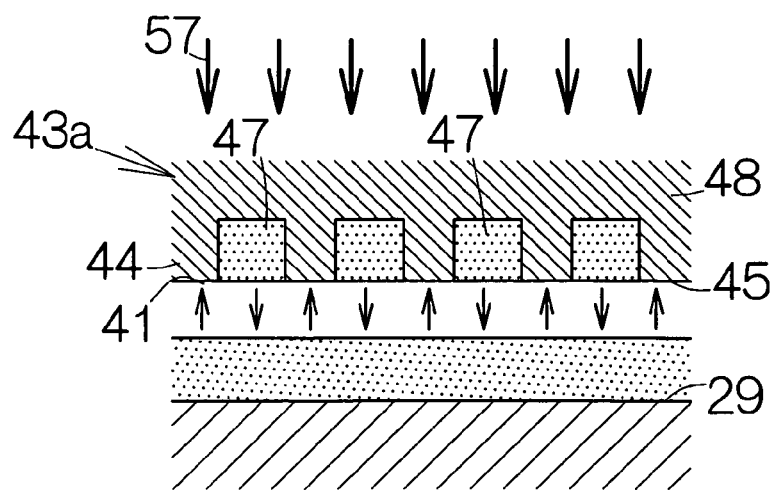
FIG. 16 is an enlarged partial sectional view schematically illustrating the process of applying a magnetic field to the die.

When the resist film 42 is embossed, the flat surface 45 drives the resist film 42 into the grooves 46 of the die 43a. The resist film 42 is allowed to get solidified while the die 43a is kept in contact with the magnetic layer 41. As shown in FIG. 16, a magnetic field 57 is then applied to the die 43a. A magnetic flux circulates in the magnetic field 57 in the direction perpendicular to the surface of the substrate 29. The magnetic flux passes through the magnetic regions 47. In this case, the magnetic flux runs toward the soft magnetic underlayer 56 from the magnetic regions 47. This magnetic flux acts on the magnetic layer 41 on the substrate 29. Magnetization is thus established in the magnetic layer 41 in the direction perpendicular to the surface of the substrate 29. The inverted magnetized regions 37 are in this manner established in the magnetic layer 41. The processes thereafter proceed in the same manner as the aforementioned first embodiment. The method of making the magnetic recording disk 14a allows the servo pattern to be positioned relative to the recording tracks 25 with a higher accuracy in a facilitated manner. This method contributes to a reduced production cost and a shortened operating time.

What is claimed is:

1. A method of making a magnetic recording medium, comprising:
    forming a resist film on a surface of a magnetic layer on a surface of a substrate;
    contacting a die, including magnetic and non-magnetic regions alternately arranged on a flat surface at a position off a groove, against the surface of the magnetic layer so as to emboss the resist film;
    solidifying the resist film while keeping the die in contact with the magnetic layer; and
    applying a magnetic field to the magnetic regions while keeping the die in contact with the magnetic layer.

2. The method according to claim 1, further comprising:
    forming a mask on the surface of the magnetic layer and a surface of the resist film after removal of the die from the substrate;
    removing the resist film; and
    removing the magnetic layer around the mask.

* * * * *